United States Patent Office 3,511,778
Patented May 12, 1970

1

3,511,778
PROCESS OF CLARIFYING SOLIDS
WATER SUSPENSION
Oscar Libor, Budapest, and Gyorgy Kollar, Fot, Hungary, assignors to Tatabanyai Szenbanyaszati Troszt, Tatabanya, Hungary, a corporation of Hungary
No Drawing. Filed Feb. 6, 1968, Ser. No. 703,268
Claims priority, application Hungary, Feb. 16, 1967,
TA-924
Int. Cl. B01d 21/01; C02b 1/20
U.S. Cl. 210—46                                            6 Claims

ABSTRACT OF THE DISCLOSURE

In the treatment of aqueous materials and particularly the clarification of solids/water suspensions flocs containing solids of suspension are formed by adding phyllosilicate dispersed and peptised in aqueous medium together with a chemical compound which is capable of bonding with the phyllosilicate.

This invention is concerned with improvements in or relating to the treatment of aqueous materials, and more particularly the clarification of solids/water suspensions (surface waters, industrial waste waters, effluents). The solids may be colloidal or larger than colloidal.

It has been previously proposed to clarify solids/water suspensions by treatment with various clarifying chemicals in order to obtain industrial or potable water. Examples of clarifying chemicals are trivalent metallic salts, e.g. $Al_2(SO_4)_3$ and ferric salts, which hydrolyse, forming in the course of hydrolysis flocs in the form of voluminous hydroxide precipitates. The flocs become bonded to the solids of the suspension. During the clarification process the size of the flocs increases and the flocs settle out. Other examples of clarifying chemicals include silicic acid gels of various particle size and structure.

In order to increase the efficiency of the clarification process polyelectrolytes e.g. poly-acrylamide, poly-amines, acrylic acid polymers, and alginates are added, but the usefulness of these has its limitations.

Also weighting agents may be used as well as clarifying chemicals and polyelectrolytes. Quartz sand or heavy spar fed as a weighting agent becomes integrated with the flocs formed in the clarifying system, thus increasing their specific gravity. This enables the throughput of the clarifying process to be increased; again this has its limitations.

It is an object of the invention to provide an improved process of clarifying a solids/water suspension.

It has been found that the clarification of solids/water suspensions can be effected by adding to the suspension to be clarified a phyllo-silicate dispersed and peptised in an aqueous medium, forming flocs by adding a chemical compound which is capable of bonding with the phyllo-silicate and separating the flocs, the formation of which is reversible and which contain solids of said suspension, and, if desired, recycling the separated flocs partly or wholly for further clarification of a solids/water suspension.

The invention provides a process of clarifying a solids/water suspension comprising the steps of forming flocs containing solids of said suspension by adding to the suspension a phyllo-silicate dispersed and peptised in an aqueous medium, and a chemical compound which is capable of bonding with the phyllo-silicate, and separating the flocs.

2

The invention also provides water when clarified using a process as set out in the last preceding paragraph.

The invention also provides solids when separated using said process.

It will be realised that mixtures of phyllo-silicates and mixtures of chemical compounds may be used.

The phyllo-silicate may be provided by a clay mineral which also includes other silicates. Preferably, the phyllo-silicate is provided by one or more of montmorillonite-like clay minerals, such as beidellite, hectorite, saponite, nontronite and vermiculite, allevardite, illite, halloysite, and these are activated, to render them readily peptised in the aqueous medium, by ion exchange with univalent cations into any one of the Na—, K—, $NH_4$— or H— forms, the particles size of the phyllo-silicate in the aqueous medium being not less than 0.05 micron. Preferably the chemical compound capable of bonding with the phyllo-silicate is organic and may be a compound of the amine type or a monomer and/or oligomer or polymer compound containing any one of the following functional groups: carbonyl-, amido-, amino-, carboxyl- and carboxyalkyl-; chemical compounds suitable for forming hydrogen bonds are preferred. Examples of suitable compounds include polyacrylamide, aqueous dispersions of oligomer or polymer polyacrylonitrile, organic acids and glue such as tannins and glue, carboxy methyl cellulose and various scleroproteins. Satisfactory results are also obtainable by the use of certain compounds having a low molecular weight including ethylene-diamine, and diethylene-triamine.

In the clarifying process preferably for each litre of suspension to be treated not less than 0.01 mg. of chemical compound is used and between 10 and 3000 mg. of phyllo-silicate are added to the suspension. The chemical compound is advantageously fed in a solution having a concentration between 0.01 and 5.0 percent by volume.

The complex system comprising the chemical compound and phyllo-silicate, separated after clarification in the form of floc-like precipitates when recycled for the further clarification of suspension, is again dispersed with comparatively low mixing energy.

Having formed the floc-suspension, the separation of the solid phase can be effected by the aid of centrifuges, hydrocyclones or by other mechanical means; preferably the separating step includes centrifuging.

Preferably in carrying out the process first phyllo-silicate is dispersed in a part of the suspension to be clarified, and then in the remainder the necessary amount of the chemical compound is dissolved. Then the two parts of the suspension are intensively mixed. Subsequently, the forming of flocs, having uniform homogeneous structure, is ensured by slower mixing.

Primary floc-formation may take place outside a conventional clarifying reactor; if the flocs are then dispersed as a result of turbulence in passing to the reactor, they reform in the reactor.

We believe that the phyllo-silicate becomes adsorbed on the surface of the particles suspended in the suspension, and/or, depending on the size of the particles, the suspended particles in the water become adsorbed on the phyllo-silicate; then the chemical compound causes the aggregates to become partly or wholly transformed into clay complexes and precipitates in the form of flocs. The flocs appear to form quickly.

It appears that the temperature applied during the clarification is not critical. Good clarification can be attained at temperatures below 5° C., even at 0.5° C. The process ording to the invention can be applied over a wide ge of turbidity grades; for example it can be applied he clarification of surface water suspensions having a idity grade in the range of 10–2000 mg./litre $SiO_2$, le then clarifying industrial waste water suspensions, n higher turbidity grades are tolerable. Also it appears t the pH is not highly critical.

t appears that the clarifying process according to the ention can be accomplished quickly, the floc suspen- retains the solid particles from the suspension permatly, the flocs aggregate quickly, their density increases they can be separated immediately after formation: sequently a high water through-put is possible and the acity of conventional clarifying equipment can be insed without interrupting its operation, and conventional equipment may be replaced by equipment of simconstruction. Also a heavy continuous gel-curtain may elop in a clarifying reactor and act as a filter for desding flocs again leading to increased capacity. The ess requires only small quantities of cheap chemicals, ch are acceptable to the health authorities of many ntries for the treatment of water to be used for drinkpurposes.

lso it appears that by choosing the dispersion grade particle size of the phyllo-silicate, and the concentra- of the suspension, respectively, the specific gravity of floc-like precipitate can be influenced within broad ts.

uther details of the process according to the invention be discussed in the following examples:

EXAMPLE I ctivated phyllo-silicate was prepared from raw bente by grinding it together with a quantity of 6 to 10 ht percent anhydrous soda. The soda-bentonite mixwas then dispersed in water, and evaporated over a r bath; then the residue was suspended in excess water sodium-montmorillonite having a particle size below icrons was separated by a centrifuge or hydrocyclones mply by settling. Another way of obtaining activated lo-silicate consists of a procedure whereby a coarseed clay mineral is swollen in water, the swollen clay mpounded by wet grinding with soda, various sodium phates, sodium fluoride or an alkali-hydrogen carte and processed afterwards as previously. An aquesuspension of 300 mg./litre concentration of sodiumtmorillonite was then prepared. A crude suspension temperature of 0.5° C. and having a turbidity grade of as poured into a beaker; the sodium-montmorillonite ng a particle size below 30 microns was added to the ension in the quantity of 300 mg./litre, and 0.5 mg./ of carboxy methyl cellulose were added. The suspenwas stirred rapidly for two minutes and then slowly 5 minutes. After mixing, the suspension was allowed ttle for 30 minutes and a sample was taken from 5 metres below the surface of the liquid. The turbidity e of the water from the settling was 12.

EXAMPLE II e procedure of Example I was substantially followed a crude suspension at a temperature of 12° C. and rbidity grade of 240, potassium-illite having a parside below 40 microns in the quantity of 280 mg./ and 0.4 mg./litre of poly-acrylamide. The clarificahaving been effected, the turbidity grade of the sample 28.

EXAMPLE III e procedure of Example I was substantially followed crude suspension at a temperature of 10° C. and rbidity grade of 120, a mixture of 40 percent by ht of ammonium-kaolinite and 60 percent by weight tassium-montmorillonite of a particle size below 40 ons in a quantity of 310 mg./litre, and a mixture of 0.3 mg./litre of poly-acrylamide and 0.5 mg./litre of glue. The turbidity grade of the sample was 24.

EXAMPLE IV

The procedure of Example I was substantially followed with crude suspension containing 300 mg./litre wood fibre particles, hydrogen-motmorillonite having a particle size below 20 microns in a quantity of 250 mg./litre and kaolinite of fine grain size in a quantity of 40 mg/litre, and 0.6 mg./litre of a mixture of poly-acrylamide and carboxy methyl cellulose. The turbidity grade of the sample was 15.

EXAMPLE V

Into a 4 m. high clarifying reactor having a diameter of 300 mm., containing Danube water having a turbidity grade of 40, flowing at a velocity of 0.4 mm./sec., and having a temperature of 5° C., sodium-montmorillonite having a particle size below 30 microns in a quantity of 300 mg./litre, and 0.5 mg./litre of carboxy methyl cellulose were successively fed. From the clarifying reactor, after a retention time of 0.5 to 1.5 hours, clarified water having a turbidity grade of 14 to 18 was recovered.

EXAMPLE VI

The procedure of Example V was substantially followed with the modification that to the Danube water, 150 mg./litre of the floc-precipitate recovered from the previous experiment, 120 mg./litre of ammonium-montmorillonite having a particle size below 20 microns and 0.3 mg./litre of carboxy methyl cellulose were added. The procedure was carried out so that in one half of the water to be clarified the ammonium-montmorillonite and the recovered floc-precipitate were intensely dispersed, while to the other half of the water to be clarified the carboxy methyl cellulose, in a 0.02 percent by volume solution, was added; then both halves were united under powerful mixing. The suspension was flocculated under slow mixing and then finally fed into the clarifying reactor. The temperature of the Danube water used for the experiment was 8° C., its turbidity grade 50. After 0.5 to 1 hour retention time the water recovered from the clarifying reactor had a turbidity grade of 10 to 12.

The solids taken from the reactor were passed to a centrifuge. The turbidity grade of water leaving the centrifuge was also 10 to 12.

EXAMPLE VII

Into the reactor of Example V Danube water having a turbidity grade between 41–47 and a temperature of 4° C. was fed and the procedure of Example VI was substantially followed. The water leaving the clarifying reactor had a turbidity grade of 12 to 15, and the turbidity grade of the water leaving the centrifuge was 10 to 12.

EXAMPLE VIII

The procedure of Example V was substantially followed with the modification that as feed water Danube water having a turbidity grade of 320 and a temperature of 3° C. was used; the velocity of the flow into the reactor was 0.6 mm./sec. The water flowing out of the clarifying reactor had a turbidity grade of 17. When the flow velocity of water fed into the clarifying reactor was increased to 1.0 mm./sec., the turbidity grade of the clarified water increased to 25 to 30.

EXAMPLE IX

The procedure of Example I was substantially followed and various samples of raw Danube water (cf. Table A, Nos. 1–4) and mine water (cf. Table A, Nos. 5–8) are clarified in the reactor of Example I.

Into each water sample 250 mg./litre sodium-montmorillonite having a particle size below 50 microns are added in a suspension concentration of 50 g./litre. After mixing, 0.5 mg./litre carboxyalkyl cellulose was successively fed.

The characterizing data of the raw water and clarified water samples are summarized in Table A.

TABLE A

| Sample No. | Temperature, °C. | pH | Turbidity grade SiO₂, mg./litre | |
|---|---|---|---|---|
| | | | Before clarifying | After clarifying |
| 1 | 12 | 7.9 | 200 | 10 |
| 2 | 14 | 7.7 | 150 | 12 |
| 3 | 13 | 7.5 | 360 | 14 |
| 4 | 14 | 7.6 | 260 | 13 |
| 5 | 11 | 7.4 | 240 | 8 |
| 6 | 12 | 7.3 | 160 | 7 |
| 7 | 12 | 7.2 | 190 | 9 |
| 8 | 13 | 7.3 | 170 | 8 |

EXAMPLE X

In a reactor of Example I raw water samples having different temperature and pH values are clarified according to the procedure of Example IX.

The characterizing data of the raw water and clarified water samples are summarized in Table B.

TABLE B

| Sample No. | Temperature, °C. | pH | Turbidity grade SiO₂, mg./litre | |
|---|---|---|---|---|
| | | | Before clarifying | After clarifying |
| 9 | 17 | 3.0 | 210 | 4 |
| 10 | 18 | 4.0 | 210 | 6 |
| 11 | 17 | 5.0 | 310 | 6 |
| 12 | 17 | 7.0 | 210 | 5 |
| 13 | 17 | 8.0 | 210 | 8 |
| 14 | 17 | 9.0 | 210 | 4 |
| 15 | 35 | 6.3 | 165 | 7 |
| 16 | 30 | 6.3 | 165 | 9 |
| 17 | 20 | 6.3 | 165 | 8 |
| 18 | 10 | 6.3 | 165 | 6 |
| 19 | 0.5 | 6.3 | 165 | 8 |

EXAMPLE XI

In a reactor of Example I various Danube water (cf. Table C, Nos. 1–2) and mine water samples (cf. Table C, Nos. 3–5) are clarified but the clarifying procedure is combined with a pre-softening of the water with lime.

Into the raw water samples the necessary amount of lime-milk is added and after mixing the samples for 10 minutes 300 mg./litre sodium- and potassium-montmorillonite (1:1) containing 10 percent sodium-illite and 5 percent kaolinite having a particle size below 50 microns is fed. The concentration of the feed suspension was 60 g./litre. Having mixed the samples for 2 minutes under quick stirring, each sample has added into it 0.8 mg./litre of a mixture of sodium-alkyl cellulose and sclero-protein in a ratio of 8:2.

The characterizing data of the feed water and the softened and clarified water samples are summarized in Table C.

TABLE C

| Sample No. | Turbidity grade SiO₂, mg./litre | | Hardness (in German degrees) | |
|---|---|---|---|---|
| | Before clarifying | After clarifying | Before clarifying | After clarifying |
| 1 | 270 | 14 | 10.0 | 4.0 |
| 2 | 350 | 12 | 11.0 | 4.1 |
| 3 | 160 | 10 | 29.0 | 7.0 |
| 4 | 190 | 11 | 24.0 | 6.0 |
| 5 | 180 | 9 | 23.0 | 6.0 |

What is claimed is:

1. A process of clarifying a solids/water suspension comprising activating a phyllosilicate by grinding it with a compound of a monovalent cationic element, dispersing and peptizing the thus-activated, phyllosilicate in an aqueous medium, forming flocs in the solids/water suspension by adding to it a composition consisting of the aqueous medium containing the dispersed and peptized activated phyllosilicate and an organic chemical compound containing a functional group which is capable of bonding with said activated phyllosilicate to adsorb the solids of the suspension in the formed flocs, and separating the flocs from the supernatant water.

2. A process according to claim 1, wherein the activated phyllosilicate is selected from the group consisting of Na, K, NH₄ and H-forms.

3. A process according to claim 1, wherein the phyllosilicate is selected from the group of clay minerals consisting of montmorillonite, beidellite, hectorice, saponite, nontronite and vermiculite, allevardite, illite and halloysite and the mixtures thereof; the particle size thereof in dispersed and peptized form is not less than 0.05 micron and not more than 30 microns.

4. A process according to claim 1, wherein the organic chemical compound contains any one of the hydroxyl-, carbonyl-, amido-, amino-, carboxyl-, and carboxyalkyl- groups and the chemical compound is used in a solution having a concentration between 0.01 and 5.0 percent by volume.

5. A process according to claim 1, wherein for each litre of suspension to be clarified between 10 and 3000 mg. phyllosilicate and not less than 0.1 mg. organic chemical compounds are added.

6. A process according to claim 1 wherein, after the flocs are separated from the supernatant water the flocs are recycled for further clarifying.

References Cited

UNITED STATES PATENTS

| 2,345,827 | 4/1944 | Olin | 210—43 |
| 2,362,022 | 11/1944 | Olin | 210—43 |
| 2,810,633 | 10/1957 | Cooper | 210—45 X |
| 3,066,095 | 11/1962 | Hronas | 210—53 |

MICHAEL E. ROGERS, Primary Examiner

U.S. Cl. X.R.

210—53; 252—181